H. P. BUCKLAND.
FOOT-WARMERS FOR VEHICLES.
No. 185,290. Patented Dec. 12, 1876.
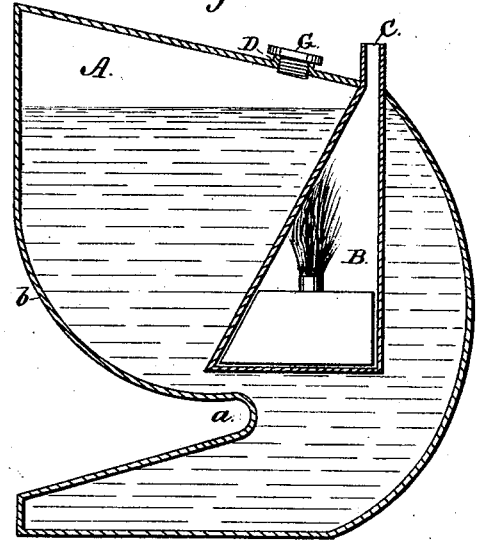
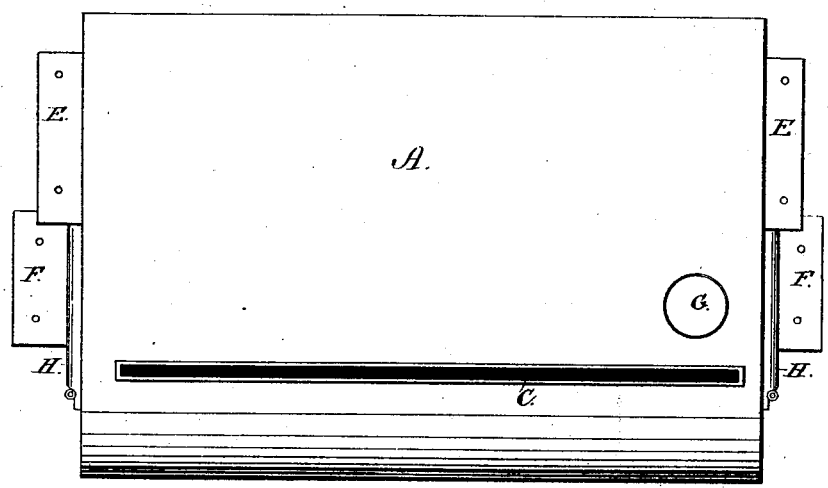
WITNESSES:
W. W. Hollingsworth
Solon C. Kemon
INVENTOR:
H. P. Buckland
BY
Munn & Co.
ATTORNEYS.

UNITED STATES PATENT OFFICE.

HENRY P. BUCKLAND, OF STONY RIDGE, OHIO.

IMPROVEMENT IN FOOT-WARMERS FOR VEHICLES.

Specification forming part of Letters Patent No. 185,290, dated December 12, 1876; application filed November 13, 1876.

*To all whom it may concern:*

Be it known that I, HENRY PETER BUCKLAND, of Stony Ridge, in the county of Wood and State of Ohio, have invented a new and Improved Foot-Warmer for Vehicles; and I do hereby declare that the following is a full, clear, and exact description of the same, reference being had to the accompanying drawing, forming part of this specification, in which—

Figure 1 is a transverse vertical section, Fig. 2 a plan view.

The object of my invention is to furnish a device for keeping the feet and lower extremities warm while riding in the winter months, and which shall be simple in construction, inexpensive, and effective. It consists of a receptacle for containing hot water, having a triangular chamber for one or more lamps extending through it, provided with doors and a smoke-escape.

In the drawing, A represents the receptacle for containing the hot water, formed with a recess, a, for the feet, in the lower portion, and a convex projection, b, extending upward as high as the knees. B is the chamber for the lamp or lamps, provided with doors H and a narrow longitudinal flue, C, forming a smoke-escape. D is an opening in the top for the admission of hot water, which opening is provided with a thumb-screw, G, for closing the same. E F are flanged projections for attaching it to the frame of the buggy, sleigh, or wagon, in which it is to be used. When desired for use, the receptacle is first filled with hot water through the opening D by removing the thumb-screw G, and the lamp or lamps are then lighted and placed within the chamber B.

For short journeys, or when the weather is not very cold, the device as thus described may be used without the heating-lamps, the receptacle being simply filled with hot water previous to starting.

Having thus described my invention, what I claim as new is—

A foot-warmer, consisting of a receptacle, A, having a recess, a, for the feet, and a convex projection, b, extending upward as high as the knees, and provided with chamber B, doors H, smoke-escape C, and an inlet for the water, substantially as shown and described.

HENRY PETER BUCKLAND.

Witnesses:
 E. H. RHOADES,
 WILLIAM LUDDINGTON.